Patented Sept. 17, 1935

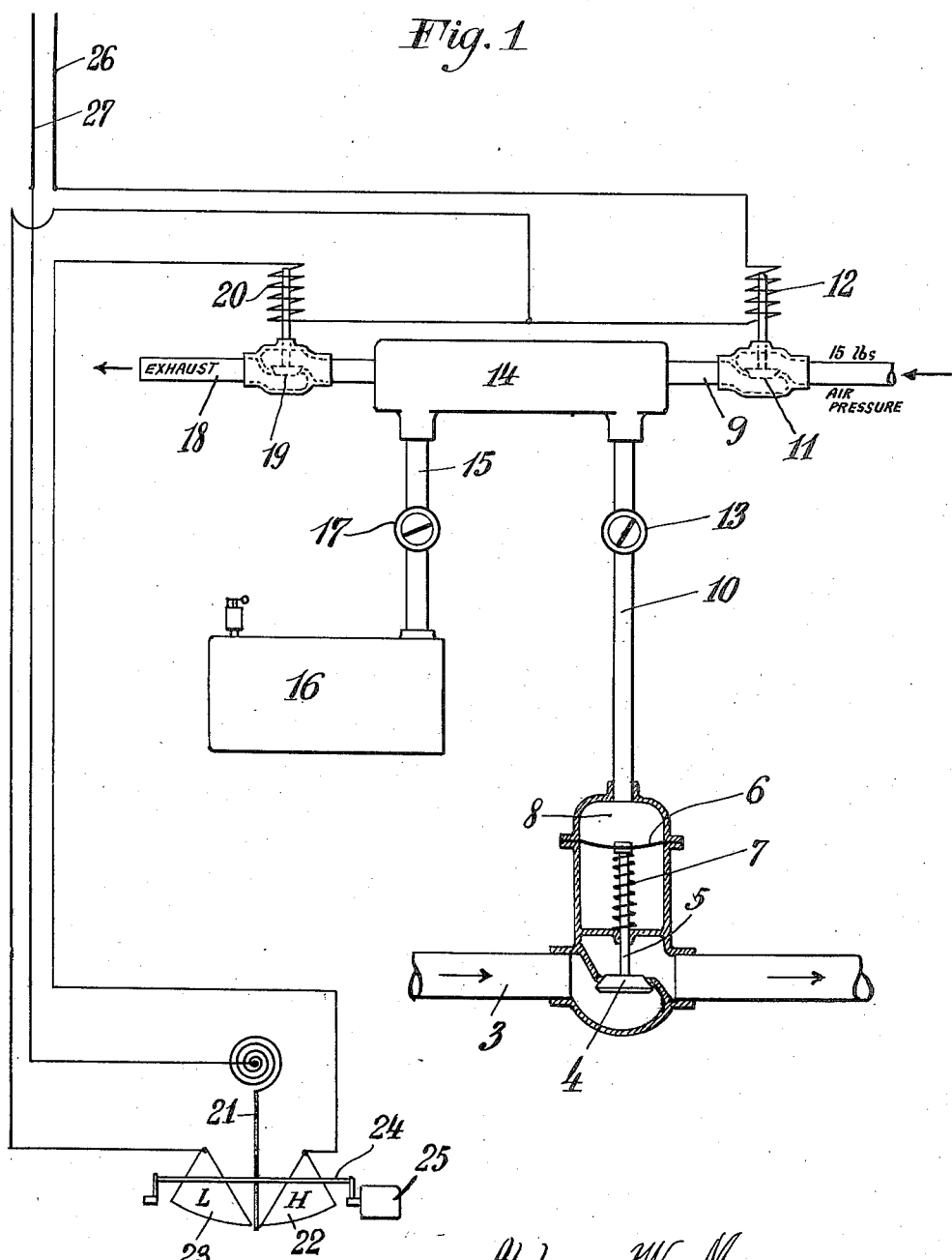

2,014,906

UNITED STATES PATENT OFFICE 2,014,906

PNEUMATIC VALVE OPERATING MECHANISM

Alphonse W. Munoz, Claymont, Del.

Application April 8, 1930, Serial No. 442,706

17 Claims. (Cl. 236—84)

The object of this invention is to provide a novel and useful method and apparatus for controlling the operations of a valve or other like element in response to temperature changes within a space heated or cooled by any suitable medium, the flow or supply of which is regulated by said valve or element.

More particularly the object of this invention is to provide a method and apparatus for operating a fuel supply valve pneumatically by means of electrically actuated mechanisms for controlling the air pressure which operates the valve. Such a method and apparatus is of particular value for instance in the oil refining industry where it is desirable that electrical apparatus be located remote from the oil tanks and other elements to avoid risks of fire and accident, and where therefore pneumatically controlled fuel supply valves are preferred. This invention therefore provides and features an apparatus adapted for operating a fuel supply valve by an electrically controlled air pressure in which the electrical apparatus may be located at a place remote from the valve mechanism. Other features and objects of the invention will appear as this specification proceeds.

The invention may be embodied in many different forms suitable for particular industries and locations and purposes. It is in this case illustrated wholly diagrammatically in the accompanying drawing in which Figure 1 is a diagram embodying the invention and Figure 2 is a detail view of an electric contact finger.

Referring to the drawing the reference numeral 3 denotes a fuel supply pipe which leads from a source of supply to a place of application, not shown. The flow of fuel through the pipe is controlled and regulated by a valve 4 carried by a stem 5 connected to a diaphragm 6 which operates under air pressure against a spring 7 which tends to close the valve. The operation and functions of these parts may of course be reversed. The valve has an air chamber 8.

Air at fifteen pounds pressure is supplied to the valve air chamber by means of the pipes 9 and 10. The air supply is controlled by a valve 11 adapted to be opened by a solenoid 12 in a well known manner. The volume of air passing through the pipe 10 is regulated by a manually operated throttle valve 13.

The pipes 9 and 10 communicate through an enlarged pipe or chamber 14. From the latter leads a pipe 15 to an air storage tank 16. The flow of air through the pipe 15 is controlled or regulated by another manually operated throttle valve 17. The heavy lines in the two throttle valves 13 and 17 indicate their respective positions. The valve 13 controlling the air supply to the fuel valve is always opened to a greater extent than the valve 17 controlling the air passing to or from the storage tank. The setting of the two throttle valves is done by the operator and depends upon local conditions. These two valves are "set for the job." An air exhaust pipe 18 also leads from the pipe chamber 14 and is controlled by an exhaust valve 19 operated by a solenoid 20.

At some point preferably remote from the place which is supplied with fuel through the pipe 3 there is located a temperature registering device such for instance as an indicating pyrometer which is shown in the drawing as comprising a spring balanced pointer 21 adapted to move between and over a high and a low contact 22 and 23. The pointer 21 is periodically depressed by a depressor bar 24 operated from a clockwork or motor 25. The solenoids 12 and 20 are connected in series with the contacts 22 and 23 and with the electric line supply wires 26 and 27, and the pointer 21.

The contacts 22 and 23 are preferably sector shaped and the pointer 21 is provided with an arrow head contact portion 29 to insure good contacts when the pointer is depressed and as will be understood.

It will further be understood that the pyrometer is connected in the usual manner with the room or space which is heated by the fuel flowing through the pipe 3 so as to indicate temperature changes in such room. These connections are not shown, being well known in the art.

Assuming now that the temperature to be controlled is normal, i. e. the desired or working temperature, then the throttle valves 13 and 17 will be set so that the air pressure on the diaphragm 6 will be about seven and one-half pounds, and while this condition exists, the pointer 21 will remain in neutral position as shown.

If now the temperature decreases, the pointer will swing in over the low contact 23 and close a circuit from the line 27 through the pyrometer, through solenoid 12 and back to the line 26.

The solenoid will be energized and open the air supply valve 11 admitting air at fifteen pounds pressure to the apparatus or system. Air pressure will immediately build up behind the diaphragm to an extent and at a speed regulated by the setting of the throttle valve 13, and the control valve 4 will be practically instantly opened to admit more fuel to effect practically an instantaneous temperature correction. However, some of the air under pressure will also pass through pipes 14 and 15 to the storage tank 16, but at a slower rate and in lesser volume due to the setting of the throttle valve 17. When thereafter the connection is broken between the pointer 21 and contact 23, the solenoid 12 will be deenergized and the valve 11 will again close. The air pressure therefore which has been built up back of the diaphragm will leak back through the pipes 10, 14 and 15 into the storage tank until the pressure in the system has been equalized.

At this time, therefore, the fuel supply valve has a new permanent position, more open, and the pressure in the tank and in the system has been increased. Fuel will now flow through the supply pipe 3 in a volume such as required to maintain a new normal or working temperature at the point of application.

When the temperature increases, the pointer 21 will close the circuit on contact 22 from the line 27, through the pyrometer, through the solenoids and back to the line 26, this time energizing solenoid 29. Consequently the exhaust valve 19 will be opened and air will be exhausted from the system through the pipe 18.

Again due to the difference in the positions of the throttle valves, the pressure behind the diaphragm 6 will decrease rapidly and instantly cause the valve 4 to close. When next the exhaust valve is closed by the breaking of the circuit in the pyrometer, the air pressure in the system will again be equalized, because air will leak from the storage tank until the pressure on both sides of the throttle valve 13 is equal and the valve 4 will of course again assume a new normal position to regulate the fuel supply to suit the new conditions.

From the foregoing explanation and description it will be seen that the fuel supply valve 4 is operated pneumatically by means of an increased air pressure coming from the pipe 9 or by means of a decreased air pressure because of the open exhaust pipe 18. That as soon as the valve 4 has been operated it is caused to assume a new position corresponding to the changed requirements in the fuel supply and that thereafter, the air pressure required for maintaining the valve in the new position is obtained by means of leakage to or from the storage tank.

The air pressure in the storage tank is always less than the supply pressure through pipe 9 and the valve 17 is always throttled more than the valve 13, consequently, air pressure in the valve chamber 8 varies instantly in response to the temperature changes while the valve maintenance pressure, if such it may be called, adjusts itself automatically in response to the pressure in the storage tank, which in turn is always more or less than the immediate decrease or increase in valve operating pressure.

It will further be understood that while certain definite pressures have been described herein, the invention is not limited thereto, but is susceptible of changes in construction, arrangement and operation dependent upon local requirement, such as may be undertaken by persons skilled in the art and within the intended and legitimate scope of the appended claims.

I claim:

1. The method of pneumatically operating a fluid medium supply-regulating valve, which comprises supplying thereto air under a predetermined pressure, simultaneously bleeding a portion of the air supply, storing the bled portion at a pressure less than said supply pressure, cutting off the supply of air to the valve, and operating the latter with the residual air under a pressure intermediate the said supply pressure and the pressure of the stored bled portion.

2. The method of pneumatically operating a fluid medium supply-regulating valve, which comprises supplying thereto air in a series of successive puffs and under a predetermined pressure, simultaneously bleeding a portion of the air supply, storing the bled portion at a pressure less than said supply pressure, cutting off completely the supply of air, and operating the valve with the residual air under a pressure intermediate the said supply pressure and the pressure of the stored bled portion.

3. The method of pneumatically operating a fluid medium supply-regulating valve, which comprises supplying thereto air under a predetermined pressure, simultaneously bleeding a portion of the air supply, storing the bled portion at a pressure less than said supply pressure but above atmospheric pressure, cutting off the supply of air to the valve, operating the latter with the residual air under a pressure intermediate the said supply pressure and the pressure of the stored bled portion, and connecting the residual air to the atmosphere and throttling the outgoing air, cutting off the flow of the outgoing air, and operating the valve under a pressure intermediate atmospheric pressure and the pressure of the stored bled portion.

4. The method of pneumatically operating a fluid medium supply-regulating valve, which comprises supplying thereto air under a predetermined pressure, simultaneously bleeding a portion of the air supply, storing the bled portion at a pressure less than said supply pressure but above atmospheric pressure, cutting off the supply of air to the valve, operating the latter with the residual air under a pressure intermediate the said supply pressure and the pressure of the stored bled portion, and connecting the residual air intermittently to the atmosphere, cutting off the flow of air to the atmosphere and operating the valve under a pressure intermediate atmospheric pressure and the pressure of the stored bled portion.

5. In a system for pneumatically operating a regulating valve controlling the passage of a fluid medium: a valve to supply air to the regulating valve for control of the same under a predetermined pressure, a storage tank connected with said air supplying means, throttling means intermediate the air supplying means and the storage tank and in communication with the regulating valve for maintaining in the tank air under a pressure less than that of the supply, and a discharge valve connected with the storage tank through the throttling means and with the air supplying valve for connecting both to the atmosphere.

6. In a system for pneumatically operating a regulating valve controlling the passage of a fluid medium: a valve to supply air to the regulating valve for control of the same under a predetermined pressure, a storage tank connected with said air supplying means, throttling means intermediate the air supplying means and the storage tank and in communication with the regulating valve for maintaining in the tank air under a pressure less than that of the supply, a discharge valve connected with the storage tank through the throttling means and with the air supplying valve for connecting both to the atmosphere, and means to individually control the operation of the respective supply and discharge valves.

7. In a system for pneumatically operating a regulating valve controlling the passage of a fluid medium: a valve to supply air to the regulating valve for control of the same under a predetermined pressure, throttling means between the air supply means and the regulating valve, a storage tank connected with said air supplying means, throttling means intermediate the air supplying means and the storage tank and in communication with the regulating valve for maintaining in the tank air under a pressure less than that of the supply, and a discharge valve connected with the storage tank through the last-named throttling means and with the air supplying valve for connecting both to the atmosphere.

8. In an automatic control system for valves, a valve, pressure responsive means for actuating the valve, means to supply thereto a fluid under a primary pressure and means selectively acting on the fluid supplying means to effect a series of intermittent valve moving impulses of the fluid, and means in communication with the fluid impulses to subject the said pressure-responsive means to valve adjusting secondary pressures.

9. In an automatic control system for valves, a fuel line, a valve in the line, means movable in response to differential air pressure for actuating the valve, means to supply air under pressure to the movable means, and means in communication with the air supply means for imparting to the said movable means a succession of impulses of the air under pressure and each having a partially cumulative effect on the ultimate positioning of said valve subsequent to the series.

10. In an automatic control system for regulating a condition: means responsive to fluid pressures and adapted to regulate a supply of fluid for controlling the condition; valve means, including shut-off means, adapted for the supply of fluid to and the exhaust of the fluid from the system for regulation of the means responsive to a fluid pressure; and conduits for the fluid under control of the valve means, communicating with the means responsive to a fluid pressure and one leading substantially unobstructed thereto and another having in communication therewith a chamber of relatively great capacity.

11. In an automatic control system for regulating a condition: means responsive to fluid pressures and adapted to regulate a supply of fluid for controlling the condition; valve means, including shut-off means, adapted for the supply of fluid to and the exhaust of the fluid from the system for regulation of the means responsive to a fluid pressure; and conduits for the fluid under control of the valve means, communicating with the means responsive to a fluid pressure and one leading substantially unobstructed thereto and another having in communication therewith a chamber of relatively great capacity, and a constriction in the last-named conduit.

12. In an automatic control system for regulating a condition: means responsive to fluid pressures and adapted to regulate a supply of fluid for controlling the condition; intermittently operating valve means, including shut-off means, adapted for the supply of fluid to and the exhaust of the fluid from the system for regulation of the means responsive to a fluid pressure; and conduits for the fluid under control of the intermittently operating valve means, communicating with the means responsive to a fluid pressure and one leading substantially unobstructed thereto and another having in communication therewith a chamber of relatively great capacity.

13. In an automatic control system for regulating a condition: means responsive to fluid pressures and adapted to regulate a supply of fluid for controlling the condition; valve means, including shut-off means, adapted for the supply of fluid to and the exhaust of the fluid from the system for regulation of the means responsive to a fluid pressure; and conduits for the fluid under control of the valve means, communicating with the means responsive to a fluid pressure and one leading substantially unobstructed thereto and another including a constriction, and means located beyond the constriction affording a closed space for the fluid, whereby the time of flow to and from the closed space is appreciably delayed.

14. In an automatic control system for regulating a condition: means responsive to fluid pressures and adapted to regulate a supply of fluid for controlling the condition; intermittently operating valve means, including shut-off means, adapted for the supply of fluid to and the exhaust of the fluid from the system for regulation of the means responsive to a fluid pressure; and conduits for the fluid under control of the intermittently operating valve means, communicating with the means responsive to a fluid pressure and one leading substantially unobstructed thereto and another having in communication therewith a chamber of relatively great capacity; and means for maintaining the duration of each action of the intermittently operating valve means in accordance with the extent of departure from a predetermined magnitude of the condition regulated.

15. In combination, a fluid pressure system, a primary and a secondary conduit in the system, a pressure operated valve connected with the primary conduit, and an expansion tank connected to the secondary conduit, valves in the respective conduits, electrically actuated means controlling a pressure supply line for the system, a circuit maker responsive to the conditions controlled by the valve for energizing the electrical means to admit a surge of pressure to the primary conduit to actuate the said valve, and the surge being absorbed by passage through the secondary conduit to the expansion tank to equalize the pressure in the system and establish and maintain a resultant valve setting.

16. A system for operating a valve controlling the passage of a medium comprising means for applying air under pressure to maintain the valve in a given position permitting the passage therethrough of a required volume of said medium, means for varying said air pressure to move the valve gradually to a different position permitting the passage therethrough of a different required volume of said medium, an electric circuit for operating said pressure varying means, means for applying a different air pressure for maintaining the valve in its said different position, and mechanisms in said circuit for opening and closing instantaneously the latter in automatic response to the volume requirements of said medium passing through the valve.

17. A system for operating a valve controlling the passage of a medium comprising means for automatically and gradually applying air under pressure to maintain the valve in any given position, means for automatically varying the air pressure to move the valve to a different position, and an electric circuit for operating said air pressure varying means instantaneously in automatic response to the volume of the said medium which passes through the said valve.

ALPHONSE W. MUNOZ.